United States Patent [19]

Wachi

[11] Patent Number: 4,647,828
[45] Date of Patent: Mar. 3, 1987

[54] SERVO SYSTEM

[75] Inventor: Shigeaki Wachi, Higashikurume, Japan

[73] Assignee: Sony Corporation, Tokyo, Japan

[21] Appl. No.: 735,299

[22] Filed: May 17, 1985

Related U.S. Application Data

[63] Continuation of Ser. No. 391,182, Jun. 23, 1982.

[30] Foreign Application Priority Data

Jun. 23, 1981 [JP] Japan .................. 56-97282

[51] Int. Cl.$^4$ ............................. G05B 19/29
[52] U.S. Cl. ...................... 318/603; 369/50; 360/73
[58] Field of Search ............ 318/603, 617, 599; 360/39, 73, 10.3; 369/50, 124, 240; 178/69.5 R; 375/113

[56] References Cited

U.S. PATENT DOCUMENTS

| 3,978,285 | 8/1976 | Tan et al. ............ 178/69.5 R |
| 4,275,466 | 6/1981 | Yamamoto ............... 375/113 |
| 4,338,683 | 7/1982 | Furukawa et al. ........ 369/50 |
| 4,386,300 | 5/1983 | Ogawa .................. 318/314 |
| 4,392,162 | 7/1983 | Yamamoto .............. 360/10.3 |
| 4,397,011 | 8/1983 | Ogawa .................. 369/50 |
| 4,418,406 | 11/1983 | Ogawa ................. 369/124 |

OTHER PUBLICATIONS

LM567/LM567C Tone Decoder Linear Databook, National Semiconductor Co.
Tone-Alert Decoder the Encyclopedia of Electronic Circuits Rudolf F. Graf, p. 213.

Primary Examiner—William M. Shoop, Jr.
Assistant Examiner—Saul M. Bergmann
Attorney, Agent, or Firm—Lewis H. Eslinger; Alvin Sinderbrand

[57] ABSTRACT

A servo system for controlling a motor rotation to rotate a disc having thereon information modulated in run length limited code is disclosed, which includes a circuit for counting the number of pulses of the maximum transition interval in the information reproduced from the disc, a loop for controlling the motor rotation at a constant linear velocity in response to the output of the counting circuit, a phase comparator for digitally phase-comparing a phase information signal of the signals reproduced from the disc with a reference signal having a frequency N times that of the phase information signal at every N times and a loop for controlling the phase of the motor through the output of the phase comparator.

11 Claims, 8 Drawing Figures

FIG. 2A (CP₁) 
FIG. 2B (CP₂) 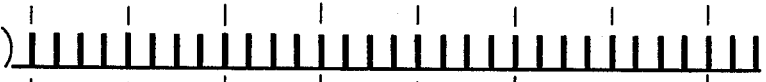
FIG. 2C (SFX) 
FIG. 2D (SFG) 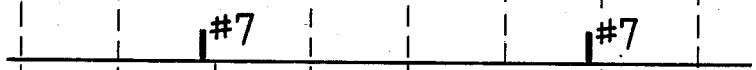
←—One Frame Cycle—→
7
FIG. 2E (SPW) 
8CP₁
16CP₁
FIG. 2F (SFG) 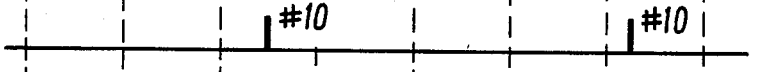
10
FIG. 2G (SPW) 
10CP₁  16CP₁

SERVO SYSTEM

This is a continuation of application Ser. No. 391,182 filed June 23, 1982.

BACKGROUND OF THE INVENTION

1. Field of the Invention

The present invention relates generally to a servo control system and more particularly relates to a servo control system having a phase servo loop for an apparatus suitable to reproduce a signal recorded on a recording medium.

2. Description of the Prior Art

In general, upon reproducing a disc such as a pulse code modulated (hereinafter, simply referred to PCM) audio disc, a servo control system is required to rotate such disc stably with high precision. Whereas, in recording a PCM audio signal on a disc, two methods have been proposed. One method is to record the PCM audio signal on the disc at a constant angular velocity and the other method is to record the signal on the disc at a constant linear velocity. To increase a recording density, the recording method at the constant linear velocity is preferable. In this case, of course, the disc on which the signal is recorded at constant linear velocity must also be reproduced at the constant linear velocity. In one proposed method of controlling the disc rotation during reproduction, the reproduced signal from the disc is employed to control the disc rotation at the constant linear velocity.

The digitized (for instance, pulse code modulated) audio signal is generally recorded by the base band system which is not the carrier modulation method such as an amplitude modulation or the like.

When the signal is recorded by the base band system, a modulation method of a run length limited code is employed. In the run length limited code modulation method, with respect to data "0" or "1", a minimum transition interval $T_{min}$ of a transition between two data is lengthened to enhance efficiency of the recording, and a maximum transition interval $T_{max}$ therebetween is shortened to make self clocking on reproduction easier. The use of this modulation method allows the maximum or minimum transition interval $T_{max}$ or $T_{min}$ to become a predetermined value. Therefore, deviation of the maximum or minimum transition interval $T_{max}$ or $T_{min}$ from a reference value is detected and used as information to control the disc rotation at a predetermined linear velocity.

In this case, taking advantage of the fact that a modulation output in which the maximum transition interval $T_{max}$ occurs in succession will not normally occur, a bit pattern where the maximum transition interval $T_{max}$ occurs twice in sequence is employed as a frame synchronizing signal. Therefore, as this frame synchronizing signal always appears during one frame period, the servo control system is controlled to make the maximum transition interval $T_{max}$ equal to the reference value, so that the linear velocity can be made constant. The maximum transition interval $T_{max}$ of this case is selected to be 5.5T (where T represents the period of a bit cell of the input data). Accordingly, in the previously proposed method, $T_{max}$ being shorter than 5.5T forms a signal to decrease the rotational velocity of the motor or $T_{max}$ being longer than 5.5T forms a signal to increase the rotational velocity thereof. As a result, this makes the linear velocity of the disc constant. After the linear velocity of the disc was made constant, the servo control system is switched to a phase servo system by a change-over switch. This phase servo system includes such an arrangement that the frame synchronizing signal in the reproduced signal is phase compared with a signal of a frame period which is supplied from a reference oscillator such as a quartz oscillator and whose frequency is divided. Therefore, the motor is controlled in phase by an output of a phase comparator.

In the servo control system as described above, the reason why the phase servo circuit is not operable initially, but is made active through the change-over done by the switch after the linear velocity was made constant by the servo means is as follows. Since a PLL (phase locked loop) circuit used in a frame synchronizing signal detecting means is limited in lock range, unless the linear velocity has been locked constant beforehand by the lock means, the disc rotation can not be locked in phase to the output of the quartz oscillator following a large change of the linear velocity done by the scanning position of the pick-up device to reproduce the signal from the disc.

By the way, it may be considered that this servo control system is made as a perfectly digital circuit. In that case, the disc driving motor is generally driven by a pulse width modulated signal (hereinafter, referred to as PWM signal). Therefore, in consideration of the digitized servo control system, it is sufficient that the phase comparator in this phase servo system produces as its output the PWM signal corresponding to phase error. But, while the phase servo signal to be supplied to the above motor is the PWM signal with a repeating frequency of data frame, the frame frequency of PCM data to be recorded on the PCM audio disc is, for example, 7.35 KHz, which belongs to an audio frequency band. Thus the previously proposed servo control system has such a drawback that noise is caused by the motor driving signal.

OBJECTS AND SUMMARY OF THE INVENTION

Accordingly, it is an object of the invention to provide a servo system in which a servo loop for rotating a motor at a constant linear velocity and a phase servo loop are constructed as digital circuits to control the motor rotation accurately.

It is another object of the invention to provide a servo system which can make the frequency of a signal for driving a motor out of audio frequency band even if a phase information signal reproduced particularly from a recording disc is a signal with a frequency belonging to the audio frequency band, thus avoiding noise in the motor.

According to one aspect of the invention, there is provided a servo system having a disc on which a signal is recorded in run length limited code modulation, said signal being recorded at a constant linear velocity, a motor for rotating said disc at a constant linear velocity, and a reproducing means for reproducing a signal, the servo system comprising:

a pulse generating source for generating a clock pulse;

means for counting the number of the clock pulses generated from said pulse generating source at every transition interval of said reproduced signal so as to discriminate whether the number of the clock pulses contained in the maximum transition interval at each predetermined frame is many or less;

means for controlling said motor rotation at a constant linear velocity in response to an output of said discriminating means;

means for providing a signal with a frequency N times higher or more than that of a phase information signal as a reference signal to one phase information of the phase information signal contained in said reproduced signal;

means for phase-comparing said reference signal with said phase information signal for N times so as to provide a phase sevro signal with a frequency which is N times that of said phase information signal and which is out of the audio frequency band; and means for supplying said phase servo signal to said motor so as to apply a phase servo thereto.

The other objects, features and advantages of the invention will become apparent from the following description taken in conjunction with the accompanying drawings through which the like references designate the same elements and parts.

BRIEF DESCRIPTION OF THE DRAWINGS

FIGS. 2A to 2G are signal waveform diagrams each used to explain the same.

DESCRIPTION OF THE PREFERRED EMBODIMENT

Figure 1:
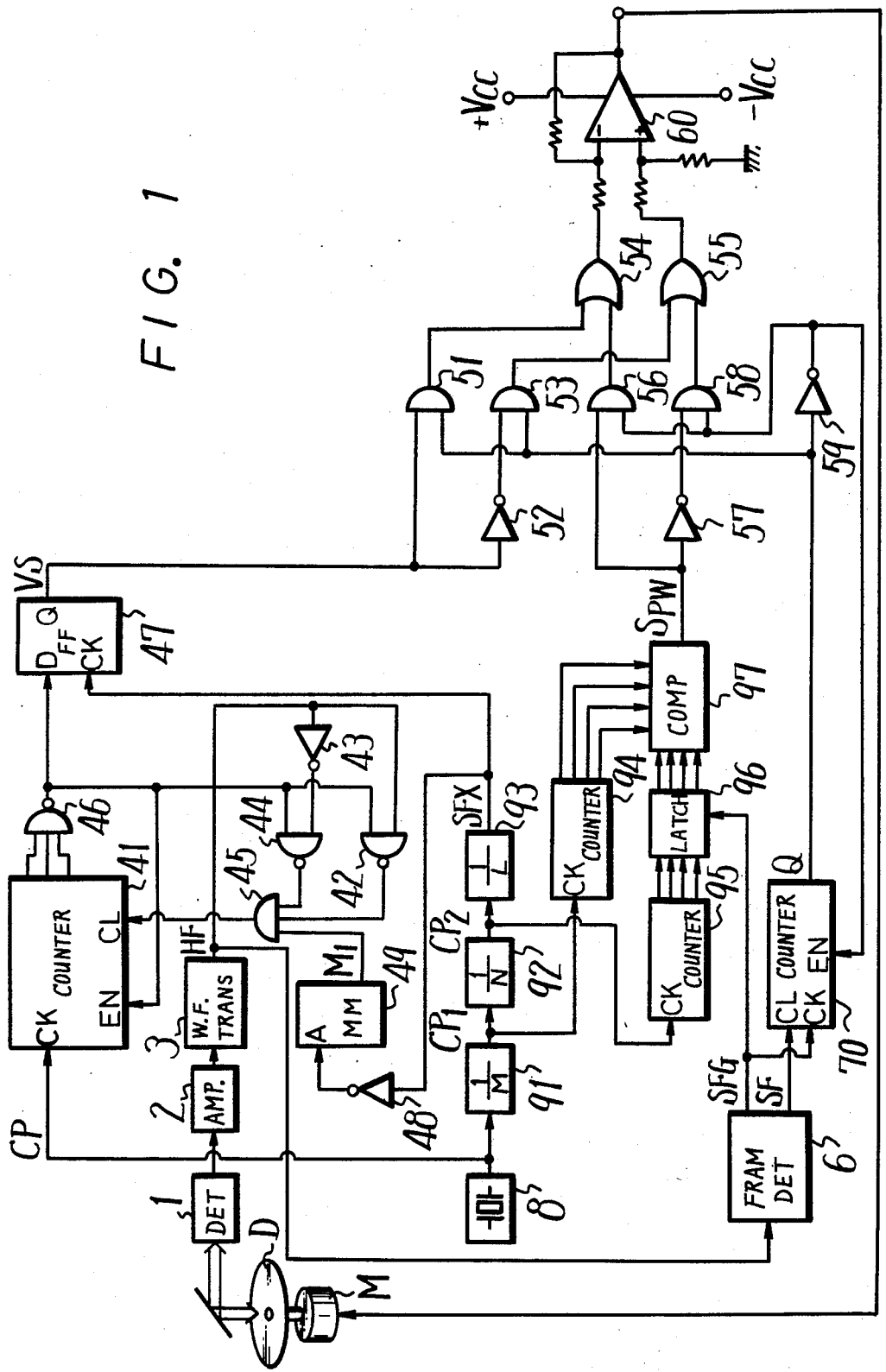
FIG. 1 is a circuit block diagram schematically showing an example of the servo system according to the invention, which is applied to a servo circuit for a PCM audio disc.

Now, an example of the servo system according to the invention will be hereinbelow described with reference to the attached drawings in FIG. 1, a disc D on which is recorded, for example, a pulse code modulated audio signal (hereinafter, simply called as PCM audio signal) or the like is loaded on a motor M. The signal such as, for example, the PCM signal which is recorded on the disc D is played back by an optical or photo detector 1. The signal is recorded on the disc D at a constant linear velocity under the run length limited code modulation method. This run length limited code modulation method is such a method in which a minimum transition interval $T_{min}$ between transitions of two data "0" or "1" is made long so as to enhance efficiency of the recording, and also a maximum transition interval $T_{max}$ therebetween is made short so as to improve easiness of self-clock upon playback much more. In this case, taking advantage of the fact that a modulated output in which the maximum transition interval $T_{max}$ is continuous does not appear in an ordinary modulation, a bit pattern in which the maximum transition interval $T_{max}$ is continued twice is used as a frame synchronizing signal. As will be described later, taking advantage of the fact that this frame synchrqnizing signal always appears during one frame period, the servo system is controlled to make the maximum transition interval $T_{max}$ become equal to the reference value, so that the linear velocity is made constant. In this embodiment of the invention, the maximum transition interval $T_{max}$ is selected to be 5.5T (where T represents the period of a bit cell of the input data).

The PCM signal reproduced by the photo detector 1 is supplied through an amplifier 2 to a waveform transforming circuit 3, in which it is transformed into a signal of binary information signal "1" and "0" (square wave signal).

Next, let us describe a servo system of the invention in detail which is schematically shown in FIG. 1.

In this embodiment, the servo circuit for the constant linear velocity serves as not only the circuit for the constant linear velocity, but also a velocity servo circuit. Moreover, this embodiment describes a case where the servo system is formed perfectly as the digital circuit and whether or not the length of the maximum transition interval $T_{max}$ in the reproduced signal is 5.5T is decided by counting the number of the clocks with the constant frequency sufficiently higher than the bit frequency of the reproduced signal at each transition interval of the reproduced signal.

In FIG. 1, reference numeral 41 denotes a counter for such purpose, which is supplied at its clock terminal CK with a clock CP of, for example, about 34.6 MHz from a quartz oscillator 8 serving as a reference oscillator. An output signal HF of the waveform transforming circuit 3 is directly supplied through a NAND gate 42 and an AND gate 45 to a clear terminal CL of this counter 41, by which this counter 41 is cleared when the signal HF rises up. The signal which the signal HF is inverted by in inverter 43 is supplied to the clear terminal CL of the counter 41 by way of a NAND gate 44 and the AND gate 45, so that this counter 41 is also cleared when the signal HF falls down. Thus the counter 41 counts the number of the clocks CP contained during the respective transition intervals of the signal HF. If there exists the transition interval where the number of the counted clocks CP is more than that of the clocks CP contained during the transition interval being given as 5.5T by even one clock, the predetermined outputs of the counter 41 all become "1" so as to put an output of a NAND gate 46 into "0". Then, since the output of this NAND gate 46 is supplied to an enable terminal EN of the counter 41, the counter 41 is stopped to count and the NAND gates 42 and 44 are closed, so that the counter 41 is not cleared by the signal HF thereafter.

Whereas, the output CP of the quartz oscillator 8 is supplied to a first frequency divider 91, in which the output CP is frequency-divided to 1/M. A frequency-divided output signal $CP_1$ (refer to FIG. 2A) therefrom is supplied to a second frequency-divider 92 thereby frequency-divided into 1/N. An output signal $CP_2$ (refer to FIG. 2B) of this second frequency-divider 92 is supplied to a third frequency-divider 93, whereby the signal $CP_2$ is frequency-divided into 1/L. This third frequency-divider 93 produces a signal SFX of the frame period (refer to FIG. 2C).

This signal SFX is supplied to a clock terminal CK a D flip-flop circuit 47, so that the output from the NAND gate 46 is latched to the D flip-flop circuit 47 at the rising up of, for example, the signal SFX.

Moreover, this signal SFX is supplied through an inverter 48 to a trigger terminal of a monostable multivibrator 49 which produces an output $M_1$ whose rising-up time is slightly delayed than that of the signal SFX. This output $M_1$ is supplied to the clear terminal CL of the counter 41 by way of the AND gate 45, so that the counter 41 is cleared when the output $M_1$ rises up. Then, the output of the NAND gate 46 becomes "1", so that the counter 41 is put into the count possible state and the NAND gates 42 and 44 are opened to allow the number of the clocks CP during the respective transition intervals of the reproduced signal to be counted again.

As described above, the D flip-flop circuit 47 latches the output of the NAND gate 46 at each frame period.

At this time, if within one frame period there exists any one of transition intervals of the signal HF exceeding 5.5T the output of the NAND gate 46 becomes "0".

Therefore, the D flip-flop circuit 47 produces an output VS which becomes "0" in next one frame period if there exists any one of the transition intervals of the signal HF longer than 5.5T during one frame period and which becomes "1" during next one frame period if not.

The output VS from this D flip-flop circuit 47 is supplied to an AND gate 51 and is also inverted by an inverter 52 to be supplied to an AND gate 53. The output of the AND gate 51 is supplied through an OR gate 54 to the inverting input terminal of an operational amplifier 60, while the output of the AND gate 53 is supplied through an OR gate 55 to the non-inverting input terminal of the operational amplifier 60.

As will be described in greater detail later, AND gates 51 and 53 are gated open by gate signal Q in the logic level "1" state during the period when the speed of rotation of the disc is brought into the constant linear velocity range. While AND gates 51 and 53 are thus held open, the output VS from flip-flop circuit 47 is passed therethrough. Accordingly, when the rotational velocity of the disc D is slow, the maximum transition interval $T_{max}$ in the reproduced signal HF exceeds 5.5T and the output VS of the D flip-flop circuit 47 becomes "0", the AND gate 51 produces the output "0" and the AND gate 53 produces the output "1", so that the operational amplifier 60 produces as its output voltage the positive voltage so as to increase the rotational velocity of the motor M.

Whereas, when the rotational velocity of the disc D is fast, the maximum transition interval $T_{max}$ of the reproduced signal HF is shorter than 5.5T and the output VS of the D flip-flop circuit 47 becomes "1", the AND gate 51 produces the output "1" and the AND gate 53 produces the output "0", so that the operational amplifier 60 produces as its output voltage the negative voltage so as to decrease the rotational velocity of the motor M.

As the linear velocity of the disc D approaches the predetermined velocity, the maximum transition interval $T_{max}$ in the signal HF approaches 5.5T. Then, the output signal VS of the D flip-flop circuit 47 repeats alternately the states of "1" and "0" during each one frame period or during each period more than one frame period in response to the detection precision in the counter 41. For instance, assuming that the signal VS is such a signal which repeats "1" and "0" alternately at every one frame period, a pulse whose duty ratio is 50% is supplied to the motor M at two-frame period. Thus the motor M is applied with a voltage of its mean level, so the disc D is locked to rotate at a predetermined linear velocity.

The gate signals for the AND gates 51 and 53 are provided as follows.

Speaking more precisely, a counter 70 is provided to obtain the above gate signals. To its clear terminal CL there is supplied a frame synchronizing signal SF, which is extracted from the signal HF, from a frame synchronizing signal detector 6 connected to the waveform transforming circuit 3. Also, its clock terminal CK is supplied with a signal SFG (refer to FIG. 2D), which is synchronized therewith, from the frame synchronizing signal detector 6. The signal SFG is derived as the signal with the same frequency as that of the frame synchronizing signal SF by frequency-dividing an output clock from a PLL circuit which provides a clock synchronized with the clock extracted from the reproduced signal HF. Since the PLL circuit does not lock stably until the rotational velocity of the disc D is locked to the constant linear velocity, the detector 6 does not derive the frame synchronizing signal SF from the reproduced signal HF and hence the detector 6 does not produce the signal SF, but produces the signal SFG only.

Therefore, since the signal SF is not developed until the rotational velocity of the disc D is locked to the constant linear velocity, the counter 70 is not cleared, but begins to count the signal SFG sequentially. In consideration of influence caused by noise or the like, when the counter 70 counts the signal SFG successively, for example, in eight times, an output Q of this counter 70 becomes "1".

When the linear velocity is made constant, the detector 6 detects and produces the frame synchronizing signal SF. Thus the counter 70 is cleared by this signal SF, and since its counted value will never amount to "8", the output "Q" remains as "0".

The output Q of this counter 70 is supplied to the AND gates 51 and 53, so that these AND gates 51 and 53 are opened until the linear velocity is made constant. After it is made constant, the AND gates 51 and 53 are closed to permit a phase servo, which will be mentioned later, to become effective for the motor M.

The phase servo operation will be performed as follows.

Speaking more specifically, the output $CP_1$ (refer to FIG. 2A) of the first frequency-divider 91 is counted by a counter 94, while the output $CP_2$ (refer to FIG. 2B) of the second frequency-divider 92 is counted by a counter 95. At this time, when the frequency-dividing ratio of the third frequency-divider 93 is selected as 1/L being equal to $1/2^m$, each of the counters 94 and 95 uses a counter of m bits. The counted output of m bits is supplied from the counter 95 to a latch circuit 96 so as to be latched therein by the signal SFG supplied thereto from the frame synchronized signal detector 6 and synchronized with the frame synchronizing signal in the reproduced signal. The output of m bits derived from this latch circuit 96 and the output of m bits from the counter 94 are supplied to and compared with each other by a digital comparator 97 which provides a signal $S_{PW}$ which becomes "1" during the period until the counted output from the counter 94 coincides with the latched output from the latch circuit 96 and which becomes "0" during the period until the counted value of the counter 94 goes back to "0" after both of the outputs coincide with one another.

In this case, since the output clock $CP_2$ from the frequency divider 92 has a frequency $2^m = L$ times a frame frequency $f_F$, the counter 95 counts within one frame period the clock $CP_2$ by the number just corresponding to the number of bits, that is, from "0" to "$2^m-1$" and repeats this counting. On the other hand, since the output clock $CP_1$ derived from the first frequency divider 91 has a frequency N times that of the clock $CP_2$, the counter 94 counts within one frame period the clock $CP_1$ from "0" to "$2^m-1$" in N times and repeats this counting. The latch circuit 96 latches the output of the counted value of the counter 95 at the period of the frame synchronizing signal, so that the latch circuit 96 latches a counted value of a difference between the beginning of the count by the counter 95 and the signal SFG. In this case, if the reference frame period is coincident with the period of the frame synchronizing signal, the same counted value is latched thereto at each frame period. On the contrary, if the reference frame period differs from the period of the frame synchronizing signal, the different counted value is latched thereto at each one frame period.

Whereas, since the counter 94 repeats the counting for N times from "0" to $2^{m-1}$" during one frame period, the comparator 97 allows two inputs to be coincident with each other for N times during one frame period, so that a signal of N periods is derived from the comparator 97 at every frame period. In other words, a signal $S_{PW}$ with the frequency N times the frame frequency $f_F$ is derived therefrom. Since the duty ratio of this signal $S_{PW}$ varies in response to the counted value to be latched to the latch circuit 96, this signal $S_{PW}$ becomes a pulse width modulated signal (hereinafter, simply referred to as PWM signal).

By way of example, assuming that each of the counters 94 and 95 is a 4-bit counter and N equals 4, since $L=2^4=16$, the clock $CP_2$ has a frequency of $16f_F$ and the clock $CP_1$ has a frequency four times high that. Thus each of the counters 94 and 95 counts the clock from "0" to "15". Now, let us assume that the counted value latched to the latch circuit 96 by the signal SFG (refer to FIG. 2D) is "7". Then, since this value "7" stays at the center of 16 counts, the comparator 97 provides the PWM signal $S_{PW}$ (refer to FIG. 2E) whose duty ratio is 50%.

Moreover, let us assume further that the counted value latched to the latch circuit 96 by the signal SFG (refer to FIG. 2F) is "10". Then, the comparator 97 provides the PWM signal $S_{PW}$ (refer to FIG. 2G) whose duty ratio is more than 50%.

Thus, signal SFG may be termed a phase information signal, as it contains the necessary information to latch latch circuit 96 at the correct time to control the phase servo loop.

This PWM signal $S_{PW}$ is supplied to an AND gate 56 and is also supplied through an inverter 57 to an AND gate 58. Since these AND gates 56 and 58 are supplied with the output Q of the counter 70 inverted by an inverter 59, after the linear velocity of the disc D is made constant, these AND gates 56 and 58 are opened to permit the PWM signal $S_{PW}$ to be supplied through the AND gate 56 and the OR gate 54 to the inverting input terminal of the operational amplifier 60 and to permit the signal $S_{PW}$ to be supplied through the AND gate 58 and the OR gate 55 to the non-inverting input terminal of the operational amplifier 60, respectively.

Thus, the motor M is driven, at that time, at the level corresponding to the duty ratio of the PWM signal $S_{PW}$. That is, as described before, in order to make the disc rotation at the constant linear velocity, voltages supplied thereto must differ from one other at the external and internal peripheries of the disc D since the rotational angular velocity of the motor M is different at the external and internal peripheries of the disc D. Such difference in voltage is achieved through the variation of the duty ratio of this PWM signal $S_{PW}$.

When the frame synchronizing signal SF is not detected by the detector 6 over eight frames in succession due to the large fluctuation of the rotational linear velocity after the rotation of the disc D is put into the constant linear velocity, the output of the counter 70 becomes "1", so that the AND gates 56 and 58 are closed, but the AND gates 51 and 53 are opened so as to allow the motor M to be controlled in rotational velocity by the output VS of the D flip-flop circuit 47. In other words, in this embodiment, the circuit for locking the rotational velocity of the disc D at the constant linear velocity serves as a velocity servo circuit.

After the rotational velocity of the motor M is locked to the constant linear velocity, the disc D is rotated stably at the constant linear velocity by the velocity servo circuit and the phase servo circuit.

Furthermore, the counter 70 is arranged such that since the output of the inverter 59 is supplied to the enable terminal EN thereof, when the output Q thereof becomes once "0", it does not count the input clock SFG until the clock SF appears next.

As described above, with the servo system of the invention, while the phase error information is provided as a signal within an audio frequency band, the frequency of the phase servo signal can be increased more than the audio frequency band thus removing the defects inherent to the previously proposed servo control system.

When the servo system is constructed as shown in FIG. 1, if the frequency-dividing ratio N of the frequency divider 92 is selected to be a suitable value, the above servo system has such an advantage that the frequency of the PWM signal for use in phase servo can be selected easily. In this connection, if the frequency-dividing ratio N is taken as 4 as in the aforesaid embodiment, the frequency of the PWM signal is given as $$4 \times 7.35 = 29.40 \text{ (KHz)}$$

thus it is out of the audio frequency band.

It is needless to say that the servo system of the invention is not limited to the servo circuit of the playback system for the PCM audio disc, but can be used as the servo circuit of various rotational driving systems.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. In a servo system for controlling the rotation of a disc on which a signal is recorded in run length limited code modulation, said signal being recorded at a constant linear velocity, a motor for rotating said disc at a constant linear velocity, and a reproducing device for reproducing the recorded signal, the servo system comprising:

a pulse generating source for generating a clock pulse signal;

discriminating means arranged to count the number of clock pulses generated from said pulse generating source at every transition interval of a reproduced signal for discriminating whether the number of clock pulses contained in a transition interval of predetermined length at each predetermined frame of said reproduced signal is above or below a predetermined limit and producing an output signal indicative thereof;

means for controlling said motor rotation at a constant linear velocity in response to said output signal of said discriminating means;

means for providing a reference signal and a phase information signal, in which said reference signal has a frequency at least N times higher than said phase information signal and said phase information signal is produced in synchronism with a frame synchronizing signal of said reproduced signal to have a frequency equal to a frame frequency of said reproduced signal;

means for phase-comparing said reference signal with said phase information signal for N times so as to provide a phase servo signal with a frequency which is N times that of said phase information signal and which is out of the audio frequency band; and means for supplying said phase servo signal to said motor so as to provide phase servo control thereto.

2. A servo system according to claim 1, in which said means for providing a reference signal and said means for phase comparing include:

a frequency divider for frequency-dividing said reference signal by N, and in which said reference signal has a frequency $N \times L$ (where N and L are integers) times that of said phase information signal;

a first m-bit (where $2^m$ equals L) counter for counting said reference signal;

a second m-bit counter for counting the output of said frequency divider;

a latch circuit for latching the counted information of said second n-bit counter by said phase information signal; and a comparator for digitally comparing the latched information from said latch circuit with the counted information of said first m-bit counter.

3. A servo system according to claim 1, wherein said discriminating means includes a counter and a memory circuit for memorizing the state of said counter at every predetermined frame of a reproduced run length limited code modulated signal, and further includes a first velocity gate circuit supplied with the output of said memory circuit, a second velocity gate circuit supplied with the output of said memory circuit by way of an inverter and a circuit for generating an output having different values in response to the outputs of said first and second velocity gate circuits so as to supply power to said motor.

4. A servo system as recited in claim 2, wherein said phase information signal is in synchronism with a frame synchronizing signal extracted from said reproduced signal, and said servo system includes a first phase gate circuit supplied with the output of said comparator, a second phase gate circuit supplied with the output of said comparator by way of an inverter and a circuit for generating an output having different values in response to the outputs of said first and second phase gate circuits so as to supply power to said motor.

5. A servo system according to claim 3, further including a circuit for deriving a frame synchronizing signal from said reproduced signal when said motor rotation is at the constant linear velocity, an output of said circuit being supplied to said first and second velocity gate circuits so as to close them.

6. Apparatus for controlling the speed of a motor rotating a disc in a system for reproducing a signal from the disc that was recorded thereon at a constant velocity in run length limited code modulation, comprising:

reference signal generating means for producing a plurality of reference signals;

constant linear velocity control means receiving a reproduced signal and a first one of said plurality of reference signals for determining whether a number of pulses of said first reference signal counted in a transmission interval of predetermined length in said reproduced signal exceeds preset limits and producing an output signal indicating such determination;

phase servo control means receiving said reproduced signal and second and third ones of said plurality of reference signals for producing an output signal in accordance with a phase of a phase information signal derived from said reproduced signal and based upon a phase comparison of said phase and said second and third reference signals; and motor control means connected to said motor and receiving said constant linear velocity control means output signal and said phase servo control means output signal for selectively energizing said motor thereby to achieve constant linear velocity and phase control thereof.

7. Apparatus according to claim 6, in which said reference signal generating means includes an oscillator producing a signal having a frequency given by $N \times M \times L$ times a recorded frame frequency, where M, N, and L are integers, and in which said first one of said plurality of reference signals is the output of said oscillator, said second one of said plurality of reference signals is the output of said oscillator divided by M, and said third one of said plurality of reference signals is the output of said oscillator divided by $M \times N$.

8. Apparatus according to claim 7, in which said output signal of said oscillator has a frequency that is out of the audio frequency band.

9. Apparatus according to claim 7, in which said phase servo control means includes a first m-bit counter, where L equals $2^m$, for counting pulses of said second reference signals;

a second m-bit counter for counting pulses of said third reference signal;

a latch circuit connected to said reproduced signal for latching the output of said second m-bit counter in synchronism with said phase of said phase information signal; and a comparator for comparing the information latched in said latch circuit with an output of said first m-bit counter.

10. Apparatus according to claim 6, in which said constant linear velocity control means includes a counter receiving said reproduced signal and said first reference signal and a memory means for memorizing the contents of said counter during said transition intervals of said reproduced signal, and gate means receiving an output of said memory and for selective operation of said motor control means.

11. Apparatus according to claim 10, further comprising a frame detector circuit for deriving a frame synchronizing signal from said reproduced signal when said motor is controlled at said constant linear velocity, an output of said frame detector circuit being fed to close said gate means.

* * * * *